United States Patent
Kimura et al.

(10) Patent No.: US 10,948,792 B2
(45) Date of Patent: Mar. 16, 2021

(54) LIQUID CRYSTAL DISPLAY DEVICE

(71) Applicant: Japan Display Inc., Tokyo (JP)

(72) Inventors: Shunichi Kimura, Tokyo (JP); Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/783,182

(22) Filed: Feb. 6, 2020

(65) Prior Publication Data
US 2020/0278586 A1    Sep. 3, 2020

(30) Foreign Application Priority Data

Mar. 1, 2019 (JP) .............................. JP2019-037340

(51) Int. Cl.
G02F 1/1362 (2006.01)
G02F 1/1333 (2006.01)
G02F 1/1343 (2006.01)

(52) U.S. Cl.
CPC .... G02F 1/136286 (2013.01); G02F 1/13439 (2013.01); G02F 1/133345 (2013.01); G02F 1/134363 (2013.01); G02F 1/136295 (2021.01)

(58) Field of Classification Search
CPC ......... G02F 1/136286; G02F 1/133345; G02F 1/13439; G02F 1/134363; G02F 2001/136295
USPC ....................................................... 349/139
See application file for complete search history.

(56) References Cited

U.S. PATENT DOCUMENTS

2008/0079001 A1 * 4/2008 Umezaki ............. H01L 27/1251
257/59
2017/0032744 A1    2/2017 Yoo et al.
2017/0343866 A1 * 11/2017 Nam ................... G02F 1/13471

FOREIGN PATENT DOCUMENTS

JP        2017-116683 A    6/2017

OTHER PUBLICATIONS

Yoo, O., et al., "Contrast Enhancement based on Advanced Local Dimming System for High Dynamic Range LCDs," SID Symposium Digest of Technical Papers, May 2017, pp. 1667-1669.

* cited by examiner

Primary Examiner — Charles S Chang
(74) Attorney, Agent, or Firm — Xsensus LLP

(57) ABSTRACT

A liquid crystal display device including a liquid crystal display panel, a back light and a light control panel set between the liquid crystal panel and the back light comprising: the light control panel comprises a first substrate, a second substrate and a liquid crystal layer between the first substrate and the second substrate, wherein a plurality of first signal wirings 11, an insulating film, and a first electrode of plenary shape are formed in this order on the first substrate, the signal wiring 11 is made of a first transparent conductive film, the first electrode is made of a second transparent conductive film, the second electrode is made of a third transparent conductive film, a dummy wiring 50 made of a same material as the first transparent conductive film is formed on a layer that the signal wirings 11 are formed.

6 Claims, 14 Drawing Sheets

LIQUID CRYSTAL DISPLAY DEVICE

CLAIM OF PRIORITY

The present application claims priority from Japanese Patent Application JP 2019-037340 filed on Mar. 1, 2019, the content of which is hereby incorporated by reference into this application.

BACKGROUND OF THE INVENTION

(1) Field of the Invention

The present invention relates to a liquid crystal display device that can display high contrast images.

(2) Description of the Related Art

A liquid crystal display device has a TFT substrate, a counter substrate opposing to the TFT substrate, and a liquid crystal layer sandwiched between the TFT substrate and the counter substrate. The TFT substrate has plural pixels arranged in matrix; each of the pixels has a pixel electrode and a thin film transistor (TFT). A transmittance of light from the back light in each of the pixels is controlled by liquid crystal molecules; thus, images are formed.

In a general liquid crystal display device, back light is irradiated even at the portion where a black is displayed; however, sometimes it occurs that the light cannot be shut completely and the light leaks, consequently, contrast of images is deteriorated. To countermeasure this phenomenon, so called a liquid crystal light valve, which is a panel to locally control light, is set at the rear side of the liquid crystal display panel; the liquid crystal light valve locally controls the amount and the position of light that is irradiated from the back light according to the images to be displayed.

Such technology is disclosed in patent document 1, patent document 2, and non-patent document 1.

LIST OF PRIOR DOCUMENTS

Patent document 1: Japanese patent application laid open 2017-116683
Patent document 2: US patent application laid open US 2017/0032744
Non patent document 1: SID 2017 Digest 1667 P108/O. Yoo et al

SUMMARY OF THE INVENTION

A contrast of images can be improved by setting the liquid crystal light valve between the rear side of the liquid crystal display panel and the back light. In other words, the back light is irradiated to the liquid crystal display panel by the liquid crystal light valve only at the portion where the images are formed, while the back light is not irradiated to the liquid crystal display panel at the position where black is displayed; thus, deep black can be attained, and thus high contrast images can be realized.

The conventional liquid crystal light valve, however, has problems as: decrease in screen brightness, non-uniformity in screen brightness, moire caused by interference between the wirings in the liquid crystal light valve and the wrings in the liquid crystal display panel.

Problems as decrease in screen brightness, moire, etc. are mitigated by using a transparent conductive film as ITO (Indium Tin Oxide), not metal, for the wirings in the liquid crystal light valve; however, the mitigation is not enough because the light transmittance of the ITO is not 100%.

The purpose of the present invention is to decrease moire and non-uniformity in screen brightness and thus, to realize the liquid crystal display device that can display high contrast images and thus high quality images, in the structure in which the liquid crystal light valve is set at the rear side of the liquid crystal display panel.

The present invention overcomes the above explained problem. Examples of concrete structure of the present invention are as follows.

(1) A liquid crystal display device including a liquid crystal display panel, a back light and a light control panel set between the liquid crystal panel and the back light comprising:

the light control panel comprises a first substrate, a second substrate and a liquid crystal layer between the first substrate and the second substrate, wherein a plurality of signal wirings, an insulating film covering the signal wirings, and a first electrode formed in a planar shape on the insulating film are formed on a surface facing to the liquid crystal layer of the first substrate, the signal wiring and the first electrode are connected via a through hole formed in the insulating film, a second electrode is formed in a planar shape on a surface facing to the liquid crystal layer of the second substrate, the signal wiring is made of a first transparent conductive film, the first electrode is made of a second transparent conductive film, the second electrode is made of a third transparent conductive film, a dummy wiring made of a same material as the first transparent conductive film is formed on a layer that the signal wirings are formed.

(2) A liquid crystal display device including a liquid crystal display panel, a back light and a light control panel set between the liquid crystal panel and the back light comprising:

the light control panel comprises a first substrate, a second substrate and a liquid crystal layer between the first substrate and the second substrate, wherein a plurality of signal wirings, an insulating film covering the signal wirings, a first electrode formed in a planar shape on the insulating film, an interlayer insulating film covering the first electrode, and a second electrode on the interlayer insulating film are formed on a surface facing to the liquid crystal layer of the first substrate, the signal wiring and the first electrode are connected via a through hole formed in the insulating film, the signal wiring is made of a first transparent conductive film, the first electrode is made of a second transparent conductive film, the second electrode is made of a third transparent conductive film, a dummy wiring made of a same material as the first transparent conductive film is formed on a layer that the signal wirings are formed, and the second electrode is between the signal wirings in a plan view.

DETAILED DESCRIPTION OF THE PREFERRED EMBODIMENTS

The present invention is explained according to the embodiments below.

First Embodiment

Figure 1:
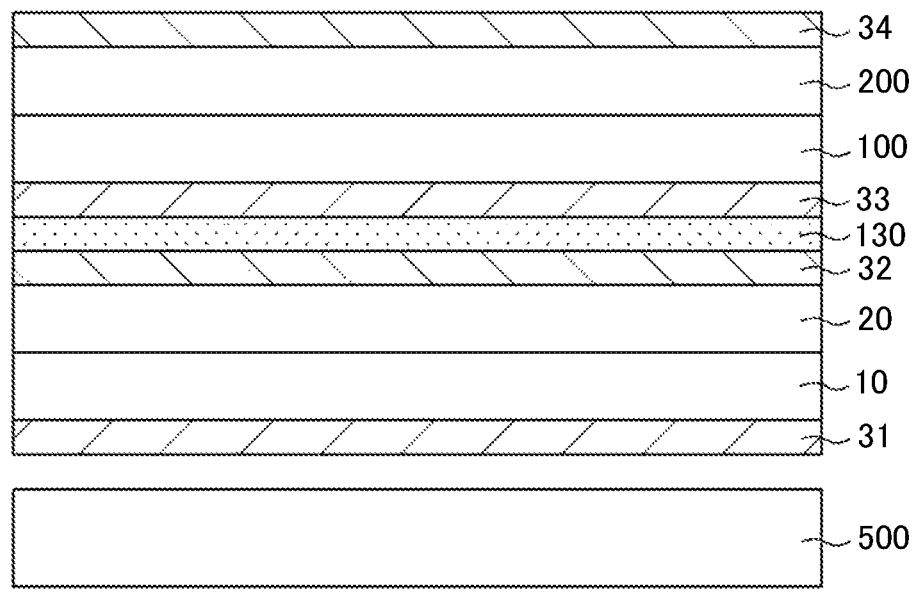
FIG. 1 is a cross sectional view of the liquid crystal display device according to the present invention.

FIG. 1 is a cross sectional view of the liquid crystal display device, which the present invention is applied. In FIG. 1, the liquid crystal light valve is set at the rear of the liquid crystal display panel; and the back light 500 is set at the rear of the liquid crystal light valve.

In FIG. 1, the liquid crystal display panel comprises the TFT substrate 100 and the counter substrate 200 adhered by the seal material; the liquid crystal layer is sandwiched between the TFT substrate 100 and the counter substrate 200. The liquid crystal display panel can be IPS mode, FFS (Fringe Field Switching) mode, or VA (Vertical Alignment) mode. In this embodiment, the liquid crystal display panel is IPS mode or FFS mode. Video signal wirings, scan signal wirings, TFTs, pixel electrodes, common electrodes, and so on are formed on the TFT substrate 100; color filters, black matrix etc. are formed on the counter substrate 200. Since the liquid crystal display panel can control only polarized light, the third polarizing plate 33 is adhered to the rear surface of the TFT substrate 100 and the fourth polarizing plate 34 is adhered to the front surface of the counter substrate 200.

The liquid crystal light valve is located at the rear of the liquid crystal display panel. The TN mode, which has an excellent light transmittance, is used for the liquid crystal light valve. The liquid crystal light valve comprises: the first substrate 10 including the data wirings for inputting brightness data, the first electrodes that receive brightness data from the data wirings; the second substrate 20 including the second electrodes; the first substrate 10 and the second substrate 20 are adhered by the seal material; the liquid crystal layer is sandwiched between the first substrate 10 and the second substrate 20.

Both the first electrode and the second electrode are formed by ITO in a plane shape. Since the liquid crystal light valve also works as a switch by the liquid crystal layer, polarizing plates are necessary; consequently, the first polarizing plate 31 is set at the rear surface of the first substrate 10 and the second polarizing plate 32 is set at the front surface of the second substrate 20. The liquid crystal light valve and the liquid crystal display panel are adhered to each other through the transparent adhesive 130

The back light 500 is set at the rear side of the liquid crystal display panel. The back light 500 is a side edge type, which comprises: the light source as LEDs, a light guide plate or a diffusing plate, optical sheets including e.g. diffusing sheets, prism sheets, and a reflecting sheet.

In general liquid crystal display device, the liquid crystal display panel forms images by controlling the light from the back light 500 in individual pixels. In the liquid crystal display device in FIG. 1, however, the light is also controlled by the liquid crystal light valve according to the area where the images are displayed in the liquid crystal display panel. For example, back light is not irradiated to the liquid crystal display panel at the area where black is displayed according to a function of the liquid crystal light valve. Therefore, the images displayed in the liquid crystal display device of FIG. 1 can display high contrast images.

Figure 2:
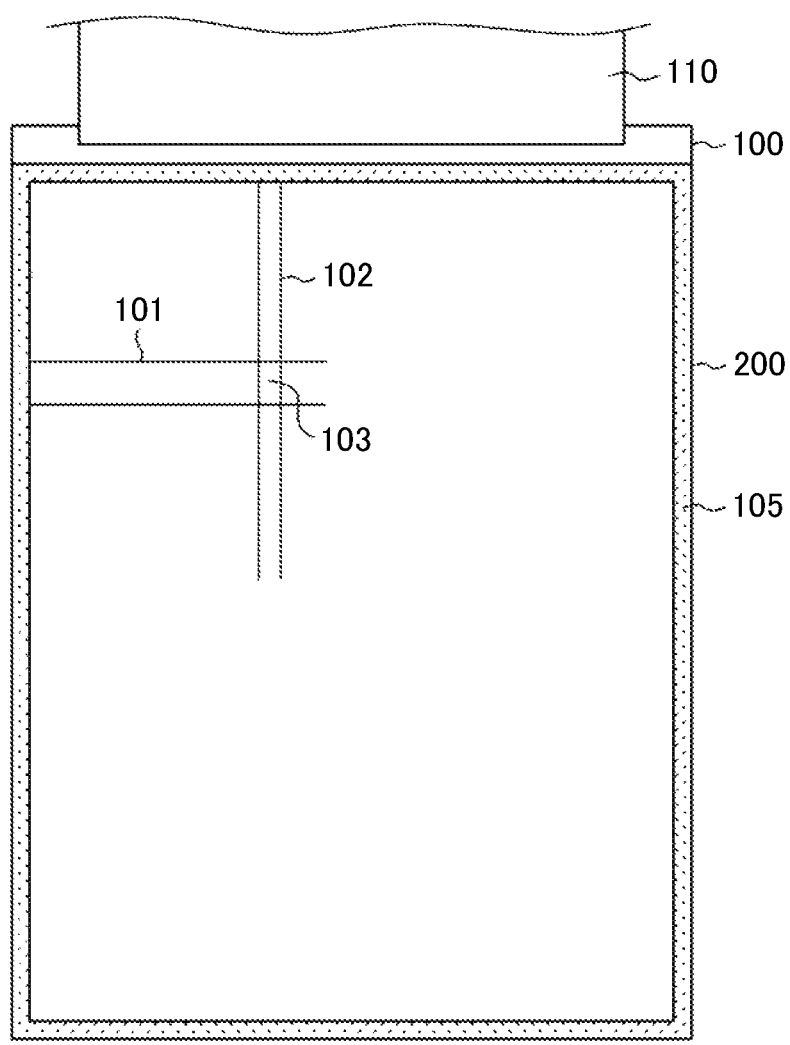
FIG. 2 is a plan view of the liquid crystal display panel.

FIG. 2 is a plan view of the liquid crystal display panel. In FIG. 2, the TFT substrate 100 and the counter substrate 200 are adhered by the seal material 105; the liquid crystal is sandwiched between the TFT substrate 100 and the counter substrate 200. The display area is formed in the area where the TFT substrate 100 and the counter substrate 200 overlap.

In the display area, the scan signal wirings 101 extend in the lateral direction (x direction) and are arranged in the vertical direction (y direction) in the TFT substrate 100; and the video signal wirings 102 extend in the vertical direction and are arranged in the lateral direction. The pixel 103, which has the TFT and the pixel electrode, is defined by the area surrounded by the scan signal wirings 101 and the video signal wirings 102

In the counter substrate 200, the color filters are formed at the positions corresponding to the pixels 103 in the TFT substrate 100 to form color images. A black matrix is formed, between the color filters, at the area corresponding to the scan signal wirings 101, video signal wirings 102 and the TFTs to suppress the reflection of external light by wrings and to suppress the color contamination.

The TFT substrate 100 is made bigger than the counter substrate 200; the area of the TFT substrate 100 that does not overlap with the counter substrate 200 constitutes a terminal area. The flexible wiring substrate 110 is connected to the terminal area to supply the video signals and the power, etc. to the liquid crystal display panel. The driver IC that drives the video signal wirings 102 is installed in the flexible wiring substrate 110.

Figure 3:
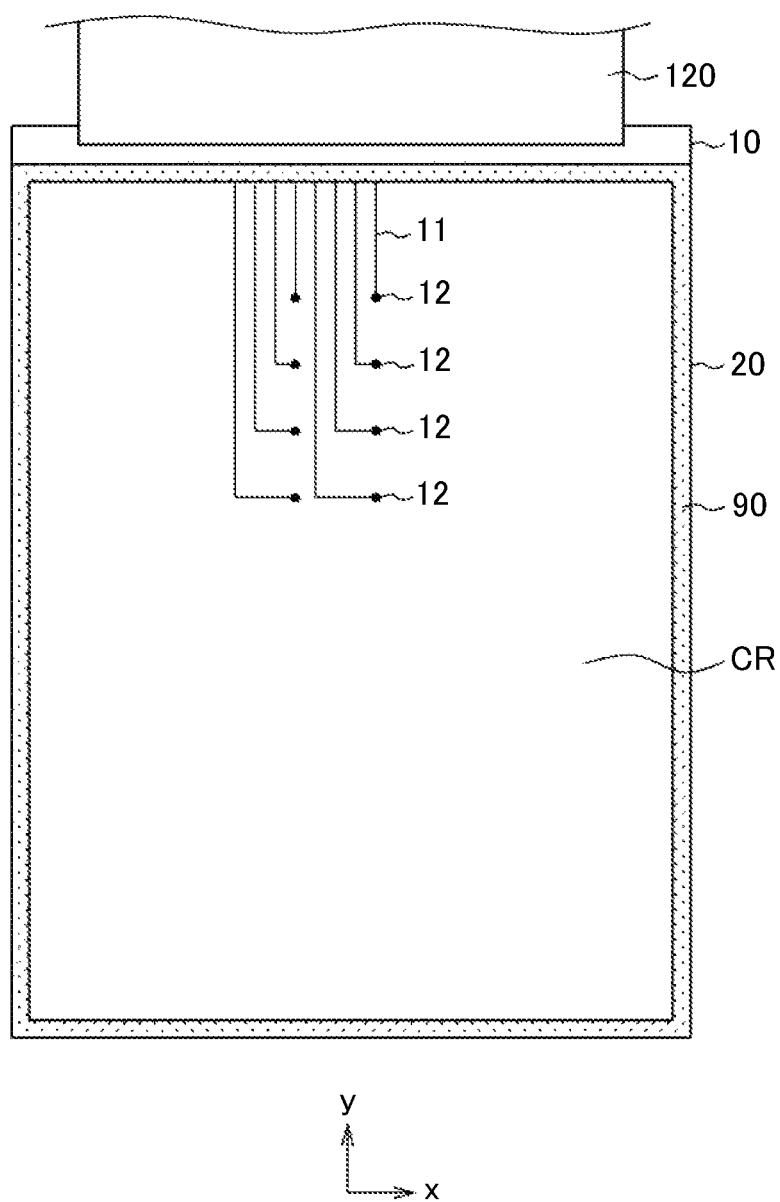
FIG. 3 is a plan view of the liquid crystal light valve.

FIG. 3 is a plan view of the liquid crystal light valve. In FIG. 3, the first substrate 10 and the second substrate 20 are adhered by the seal material 90; the liquid crystal is sandwiched between the first substrate 10 and the second substrate 20. The light control area CR is formed in the area where the first substrate 10 and the second substrate 20 overlap.

The first substrate 10 is made bigger than the second substrate 20; a terminal area is formed in the first substrate 10 where the first substrate 10 and the second substrate 20 do not overlap. Plural terminals are formed in the terminal area, which the flexible wiring substrate 120 is connected to.

The flexible wiring substrate 120 supplies the brightness data and the power, etc. to the liquid crystal light valve through the terminals in the terminal area.

In the light control area CR, the first electrode 14 (see FIG. 7) is formed on all over the first substrate 10 in a plane shape by the transparent conductive film of ITO. The data wirings 11 extend in the vertical direction (y direction) and are arranged in the lateral direction (x direction) under the first electrode 14 via the insulating film 13 (see FIG. 7). The data wiring 11 bends in L shape in lateral direction, and connects with the first electrode 14 at the wire connecting point 12, which is formed in the through hole 121 formed in the insulating film 13. FIG. 3 shows only a portion of the wiring connection points 12; in actual products, however, the wiring connection portions are distributed in uniform interval in x direction and y direction all over the light control area CR. Different brightness data (voltage) is applied to each of the wiring connection points 12; consequently, a voltage gradient is formed in the first electrode 14 between the wiring connections 12.

The second electrode 21 (see FIG. 7) is formed in a plane shape by the transparent conductive film of ITO on the second substrate 20. A constant voltage is applied to the second electrode 21. Since the light valve controls only the brightness, color filters are not used to improve transmittance of the liquid crystal light valve. Further, a black matrix is not formed in the liquid crystal light valve to avoid moire, which could be generated by interference between a black matrix of the liquid crystal light valve and the scan signal wirings or the video signal wirings in the liquid crystal display panel.

Figure 4:
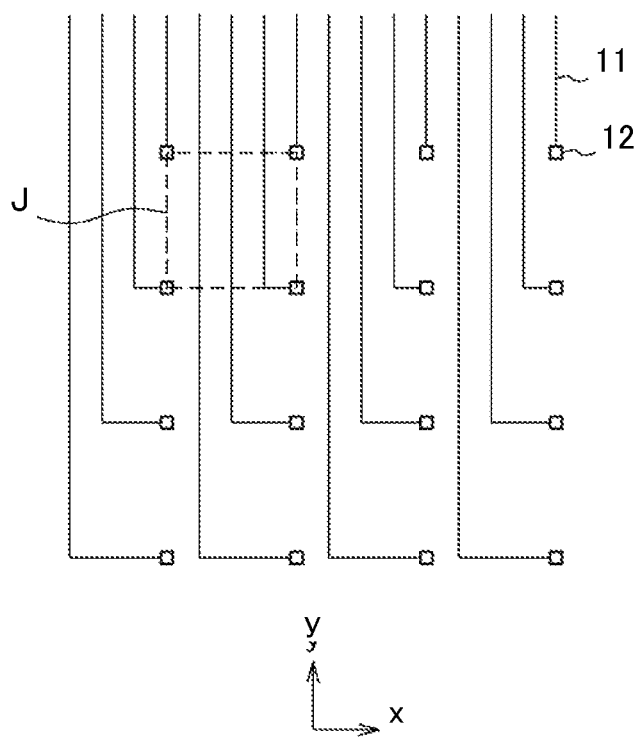
FIG. 4 is a layout of the data wirings and the through holes in the liquid crystal light valve.

FIG. 4 is an enlarged plan view that shows a layout of the data wrings 11 and the wiring connection points 12 in the light control area CR in the liquid crystal light valve. By the way, the first electrode 14 is formed by the transparent electrode in a plane shape over the data wirings 11 via insulating film 13 and connects with the data wring 11 at the wire connecting point 12. The rectangular area, defined by four broken lines, shown by J, has four corners of wiring connection points 12, defines a segment of light control area. The light control area CR is a congregation of a plurality of the segments.

If the voltages at the four wiring connection points 12 are the same, the brightness in the segment is approximately uniform. In the area where images are formed, however, the four wiring connection points 12 are generally applied with different voltages; thus, the voltages of the first electrode 14 in a segment are different according to positions. Consequently, light transmittance of the liquid crystal is different according the position in the segment because the rotation of the liquid crystal molecules is different according to the positions in the segment. The light transmittance in the segment is determined by the voltage applied by the data wiring 11 via the wiring connection point 12. If the potential difference is big between the wiring connection points 12, the transmittance gradient in the segment becomes bigger.

If a pixel set is defined by a combination of the red pixel R, the green pixel G and the blue pixel B in the liquid crystal display panel, and the liquid crystal display panel has a size of 1200×900 pixel sets, the segment exists, for example, 45 (in x direction)×20 (in y direction) in the liquid crystal light valve. However, in a use of high definition liquid crystal display panel, or in a used of VR (Virtual Reality) where pixel sets are enlarged, the number of the segments can be increased in the liquid crystal light valve.

Figure 5:
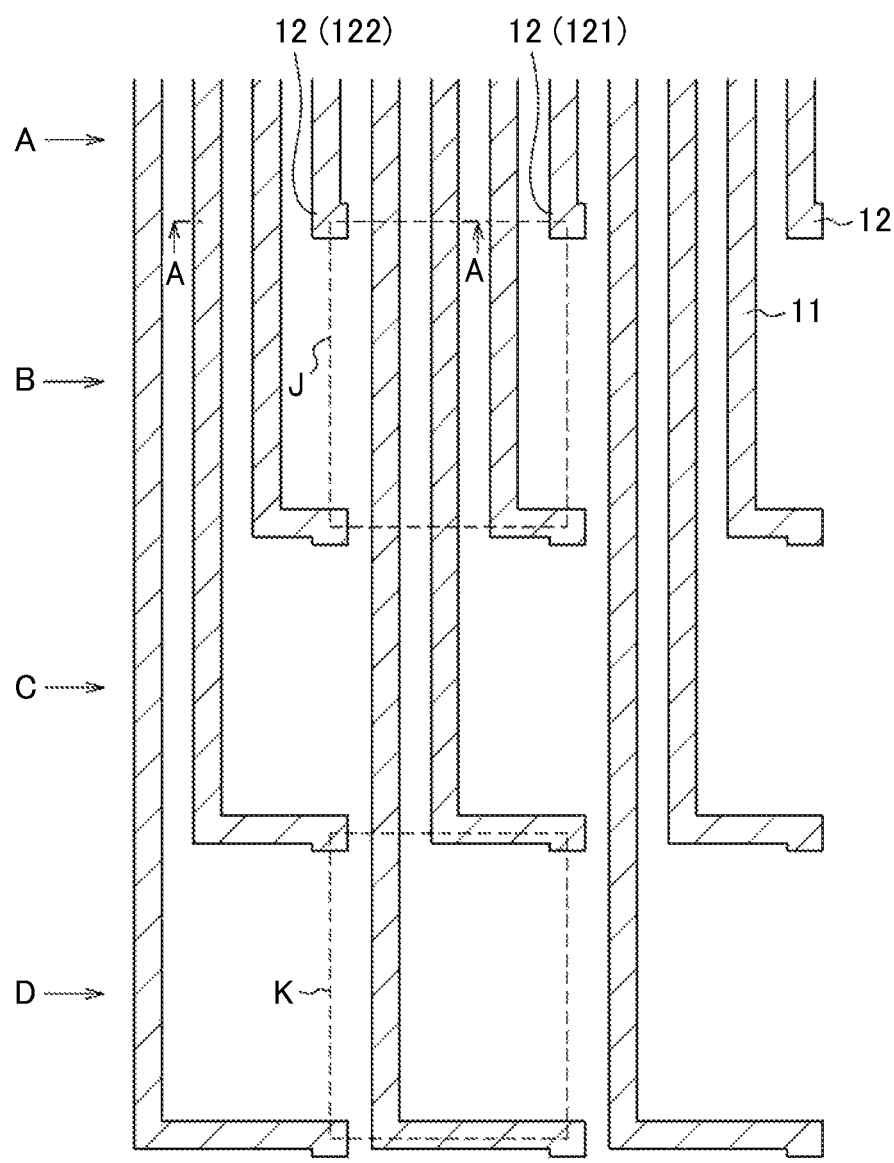
FIG. 5 is an enlarged view of the layout of the data wirings and the through holes of the liquid crystal light valve.

FIG. 5 is a further enlarged plan view of FIG. 4. The width of the data wiring 11 is shown in FIG. 5. In FIG. 5, the layout of the data wirings 11 and the wiring connection points 12, and configuration of first electrode 14 are the same as explained in FIG. 4. The data wirings 11 are formed by ITO, which is a transparent electrode.

When the segment J and the segment K are compared in FIG. 5, the segment J has three data wirings 11 while the segment K has only one data wiring 11. If the transmittance of the ITO used for the data wiring 11 is 100%, there exists no differences in light transmittance between the segments; however, the ITO has a certain value of transmittance.

Figure 6:
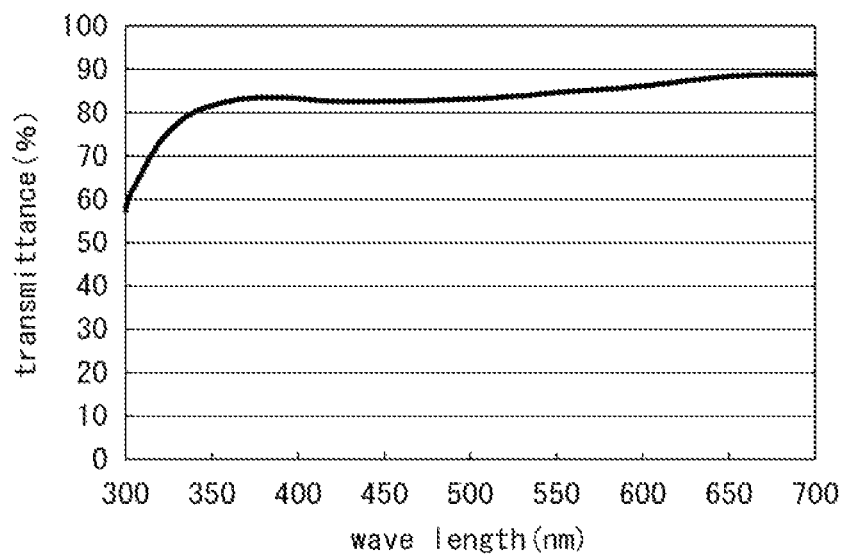
FIG. 6 is a spectral transmittance of the ITO film.

FIG. 6 is a diagram that shows a spectral transmittance of the ITO when its thickness is 77 nm. The transmittance of the ITO is different in spectrum; the transmittance is 85% for wavelength of 550 nm. In the liquid crystal light valve in this embodiment, the ITO film is formed thicker than the case of FIG. 6, and is formed as a thick ness of 100 nm to decrease the resistance of the data wiring 11. The transmittance of the ITO of a thickness of 100 nm is 81% when converted from FIG. 6. Therefore, the transmittance of the liquid crystal light valve is influenced by existence of data wiring 11.

Back to FIG. 5, number of the data wirings in the area indicated by arrows A, B, C, and D are all different. There are 4 wirings 11 in the place indicated by arrow A, three wirings 11 indicated by arrow B, two wirings 11 indicated by arrow C, and one wiring 11 indicated by arrow D. Therefore, the brightness increases from the area indicated by arrow A to the area indicated by arrow D.

This structure causes two problems. The first one is a non-uniformity in brightness according to differences in transmittance between the segments because each of the segments has a size of about 45×20 of pixels in the liquid crystal display panel. The second one is that this non-uniformity in brightness is periodical, thus, a moire arises in relation with the liquid crystal display panel.

Figure 7:
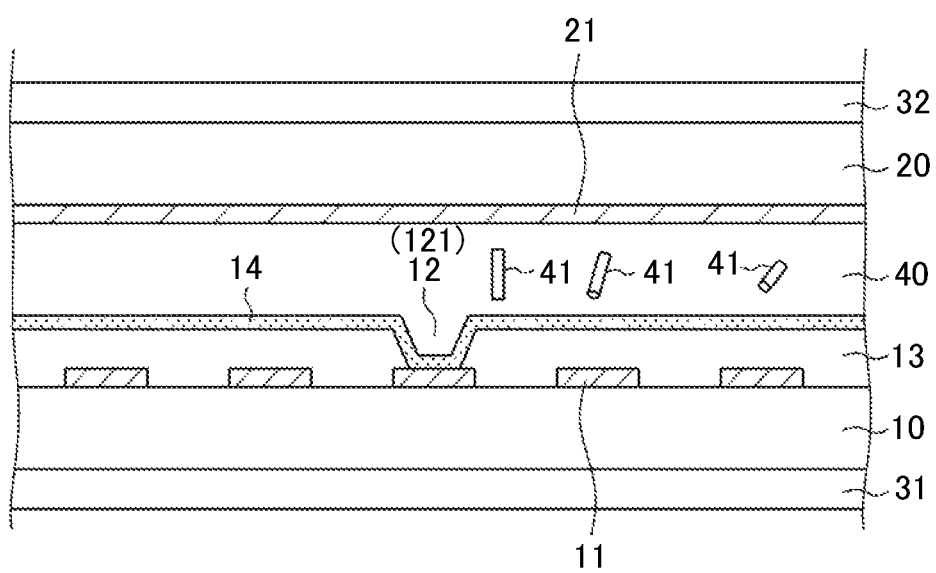
FIG. 7 is cross sectional view of FIG. 5 along the line A-A.

FIG. 7 is cross sectional view of the liquid crystal light valve, which corresponds to cross sectional view of FIG. 5 along the line A-A. In FIG. 7, data wirings 11 are formed periodically on the first substrate 10, which is formed by e.g. glass. The data wirings 11 are formed by ITO, which is a transparent oxide conductive film. A thickness of the ITO is e.g. 100 nm; sheet resistance is approximately 45 ohm/square. The insulating film 13 made of e.g. silicon oxide is formed in a thickness of approximately 200 nm over the data wirings 11. The through hole 121 for forming the wiring connection points 12 is formed in the insulating film 13 to connect the data wiring 11 and the first electrode 14. The first electrode 14 is formed by transparent conductive film over the insulating film 13. The transparent conductive film, which constitutes first electrode 14, needs to have bigger resistivity than the ITO, which constitutes data wiring 11. Such transparent conductive film is e.g. IZO (Indium Zinc Oxide) film or AZO (Antimony Zinc Oxide) film.

The material, thickness, and manufacturing conditions are chosen for the first electrode 14 so that the sheet resistance becomes approximately $10^4$ ohm/square. A large current can be avoided in the data wiring 11 by making the sheet resistance of the first electrode 14 bigger. The alignment film on the first electrode 14 is neglected in FIG. 7.

In FIG. 7, the second substrate 20 is set opposing to the TFT substrate 10 sandwiching the liquid crystal layer 40. A color filter or a black matrix does not exist in the second substrate 20 to increase light transmittance and to avoid moire due to black matrix. Consequently, only the second electrode 21 is formed in a plane shape on the second substrate 20 in FIG. 7.

The second electrode 21 is formed by ITO film, which is a transparent conductive film. A thickness and the manufacturing condition of ITO are chosen so that the ITO film has a suitable conductivity. A thickness of the ITO film is determined considering the conductivity and the transmittance of light. In the actual products, an alignment film is formed on the second electrode 21, but the alignment film is neglected in FIG. 7.

In FIGS. 5 and 7, when a voltage is applied to the first electrode 14, a potential difference arises between the wiring connection point 12 of the first electrode 14 and the second electrode 21. In the vicinity of the wiring connection point 12, where the voltage is applied, the liquid crystal molecule aligns almost perpendicularly to the major surface of the first substrate 10.

When the voltage is different between the adjacent wiring connection points 12, for example, provided the voltage applied to the wiring connection point 12 (121) is higher than that of the adjacent connection point 12 (122) in FIG. 5, the alignment of the liquid crystal molecules become different in between the wiring connection point 12 (121) and the wiring connection point 12 (122). In this case, the liquid crystal molecules 41 twist and tilt in going from the wiring connection point 12 (121) to the wiring connection point 12 (122); in other words, the transmittance of the liquid crystal layer 40 changes. According to the above principle, the transmittance of the liquid crystal layer 40 can be controlled in a segment.

In FIG. 7, the data wirings 11 are arranged in the lateral direction with certain interval on the first substrate 10. The transmittance of the data wiring 11 is approximately 81% for the light of wave length 550 nm, provided the data wiring is formed by ITO and the thickness is 100 nm. Consequently, the light emitted through the liquid crystal light valve repeats dark and bright according to the light that passed through the data wiring 11 and the light that did not pass through the data wiring 11.

On the other hand, the liquid crystal display panel has a periodical dark and bright pattern because of the video signal wirings 102, the scan signal wirings 101, the black matrix, and so on. Consequently, there arises a moire by interference between the data wirings 11 of the liquid crystal light valve and the elements of the liquid crystal display panel like the video signal wirings 102, the scan signal wirings 101, the black matrix, and so on.

As described above, when the liquid crystal light valve and the liquid crystal display panel are overlapped, there arises a moire caused by periodical changes in brightness between segments in the liquid crystal light valve and a moire caused by transmittance of the data wirings 11 of the liquid crystal light valve. In addition, non-uniformity in brightness of the liquid crystal light valve causes non-uniformity in brightness of images.

Figure 8:
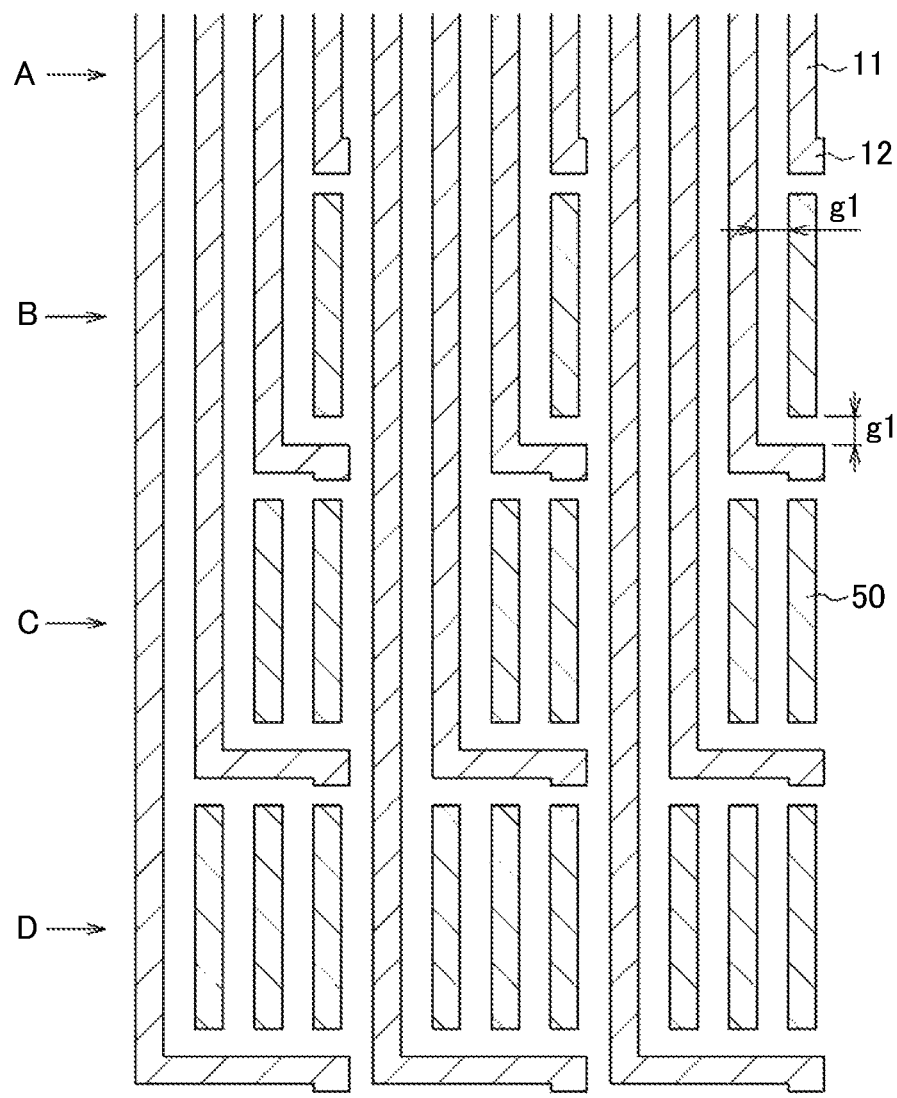
FIG. 8 is a plan view of a first example of the first embodiment.

The present invention solves the above explained problems. FIG. 8 is a plan view of the first example of the first embodiment. In FIG. 8, the data wirings 11 are arranged as the same layout as FIG. 5. FIG. 8 differs from FIG. 5 in that dummy wirings 50 are formed when there exists a gap between the data wirings 11 so that the transmittance becomes uniform between the segments.

The dummy wiring 50 is formed by ITO; a thickness and a width are the same as the data wiring 11. The gap g1 between the data wiring 11 and the dummy wiring 50 is the same as a gap between the data wirings in the area shown by arrow A, which is closest to the terminal area in FIG. 8. Therefore, the transmittances at the areas indicated by arrows A, B, C and D are all the same in FIG. 8. In other words, the moire that is caused by repeated changes in transmittance between segments can be avoided in the structure of FIG. 8. Further, non-uniformity of brightness in the display screen caused by non-uniformity between segments can also be avoided.

Figure 9:
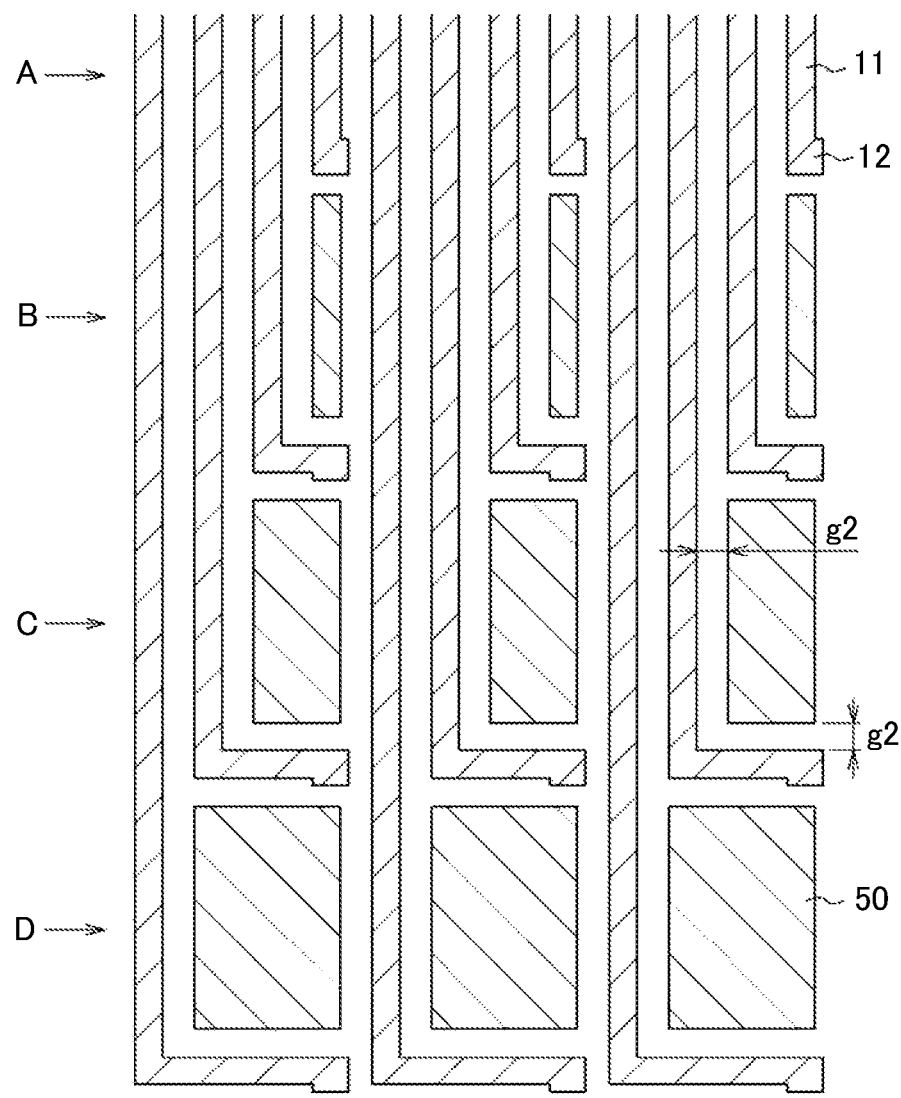
FIG. 9 is a plan view of a second example of the first embodiment.

FIG. 9 is a plan view of a second example of the first embodiment. In FIG. 9, data wirings 11 are formed in the same layout as FIG. 5. FIG. 9 differs from FIG. 8 in that dummy wirings 50 are different between the segments when there is a gap between the data wirings 11 in each of the segments. The transmittance of light in each of the segments, however, is set to be approximately the same.

In FIG. 9, the gap g2 between the dummy wiring 50 and the data wiring 11 is the same as the gap between the data wirings 11 in the area indicated by arrow A. However, the gap g2 can be smaller than the gap between the data wirings 11 or can be bigger than the gap between the data wirings 11 according to requirement of the layout.

In FIG. 9, too, the transmittances of the areas corresponding to arrow A, arrow B, arrow C, and arrow D are the same. In other words, the moire that is caused by repeated changes in transmittance between segments can be avoided in the structure of FIG. 9. Further, non-uniformity of brightness in the display screen caused by non-uniformity in each segments can also be avoided. In addition, in the structure of FIG. 9, regularity is broken compared with the structure of FIG. 8, therefore, moire can be further mitigated.

Figure 10:
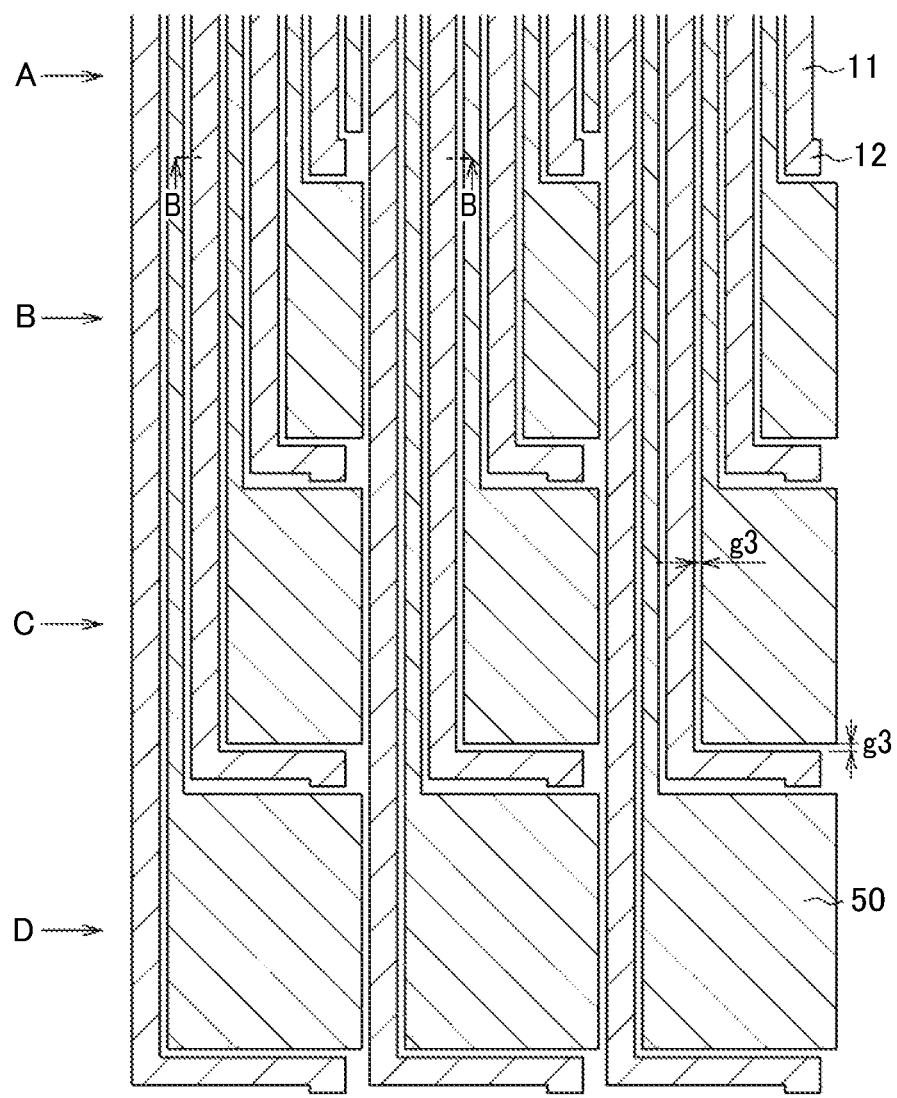
FIG. 10 is a plan view of a third example of the first embodiment.

FIG. 10 is a plan view of third example of the first embodiment. In FIG. 10, data wirings 11 are formed in the same layout as FIG. 5. FIG. 10 differs from FIGS. 8 and 9 in that dummy wirings 50 are formed between the adjacent data wirings 11 as depicted in e.g. the area indicated by arrow A. The gap g3 between the data wiring 11 and the dummy wiring 50 is to be set as small as possible. The gap g3 is 10 micrometer or less, preferably 5 micrometer or less.

In other words, almost all the area of the light control area CR of the liquid crystal light valve is covered by the data wirings 11 and the dummy wirings 50. Therefore, moire, which is caused by e.g. interference between the data wiring 11 and the video signal wirings 102 of the liquid crystal display panel, can be avoided. In addition, the moire that is caused by repeated changes in transmittance between segments can be avoided. Further, non-uniformity of brightness in the display screen caused by non-uniformity between segments can also be avoided.

Figure 11:
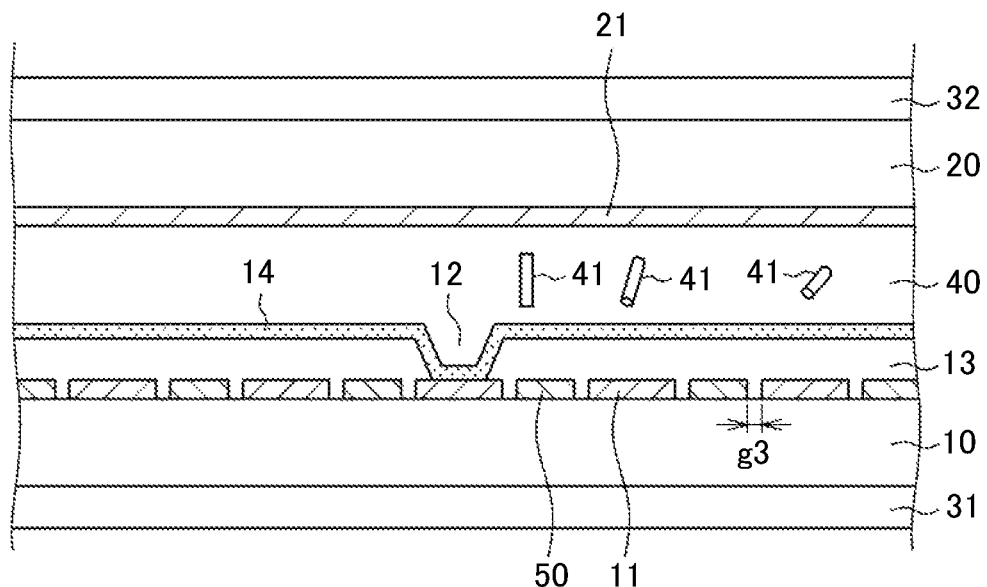
FIG. 11 is cross sectional view of FIG. 10 along the line B-B.

FIG. 11 is cross sectional view of FIG. 10 along the line B-B. FIG. 11 differs from FIG. 7 in that a dummy wiring 50 is set between the data wirings 11. The gap g3 between the data wiring 11 and the dummy wiring 50 is 10 micrometer or less, preferably 5 micrometer or less. Therefore, approximately all area of the first substrate 10 is covered by the data wirings 11 and the dummy wirings 50. Therefore, the moire, which is caused by data wirings 11 themselves in the liquid crystal light valve, and the moire, which is caused by repeated changes in transmittance between the segments due to dense and sparse of data wirings 11 in the segment can be avoided. Further, non-uniformity in brightness of the screen caused by difference in transmittance between the segments caused by dense and sparse of data wirings 11 in the segment can be avoided.

Second Embodiment

Figure 12:
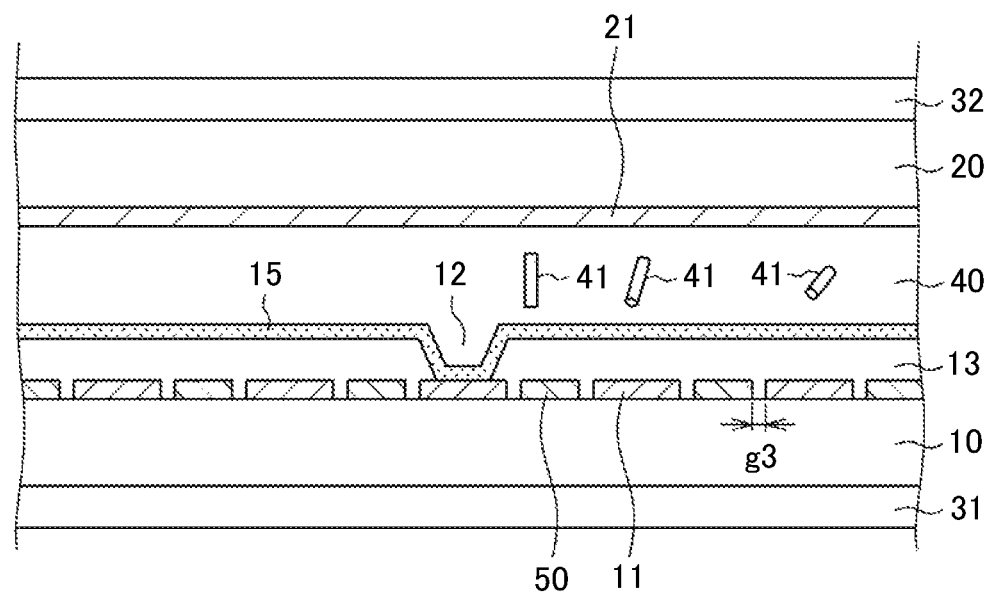
FIG. 12 is a cross sectional view of the liquid crystal light valve according to the second embodiment.

FIG. 12 is a cross sectional view of the liquid crystal light valve according to the second embodiment. The relative configuration of the liquid crystal display panel and the back light is the same as shown in FIG. 1. FIG. 12 differs from FIG. 11 in that the first electrode 15 is not a transparent conductive film but it is an oxide semiconductor film.

However, even the first electrode 15 is the oxide semiconductor film, the sheet resistance is set approximately $10^4$ ohm/square by setting the thickness and the manufacturing process conditions of the semiconductor film as in the case of the transparent conductive film.

Examples of the transparent oxide semiconductor are e.g. IGZO (Indium Gallium Zinc Oxide), ITZO (Indium Tin Zinc Oxide), ZnON (Zinc Oxide Nitride), IGO (Indium Gallium Oxide). The present invention is explained when IGZO is used as the transparent oxide semiconductor.

The first electrode 15, which is formed by the oxide semiconductor, changes its resistivity according to the amount of oxygen in it. The silicon oxide is used for the first insulating film 13 to supply oxygen to the oxide semiconductor film 15, and thus, the oxide semiconductor film 15 can maintain certain resistance. According to the above structure, the sheet resistance of the oxide semiconductor film 15 is maintained in approximately $10^4$ ohm/square by setting its thickness in about 50 nm.

The data wirings 11 use the ITO in this embodiment, too. Therefore, the problems of moire caused by the data wirings 11 are the same as explained in the first embodiment. Therefore, as explained in the first embodiment, the problems of moire can be counter measured by forming dummy wirings 50 as explained in FIGS. 8-10.

Other structures of FIG. 12 are the same as FIG. 11. Therefore, even the oxide semiconductor film 15 is used for the first electrode 15, the problems of moire and non-uniformity in brightness can be counter measured as explained in the first embodiment, which uses the ITO for the first electrode 14, except silicon oxide film needs to be used for the insulating film 13 as the under layer.

Third Embodiment

Figure 13:
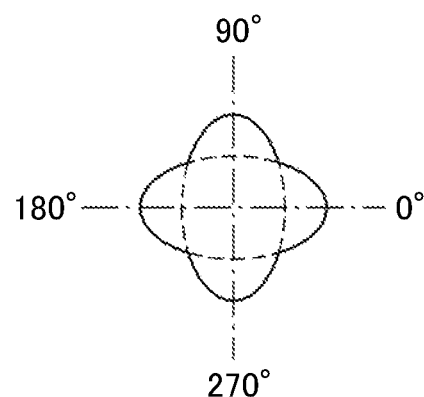
FIG. 13 is an example of viewing angle characteristics of IPS (In Plane Switching) mode liquid crystal display device.

In the first embodiment and the second embodiment, IPS mode is used for the liquid crystal display panel and TN mode is used for the liquid crystal light valve. IPS mode has good viewing angle characteristics; however, the viewing angle characteristics are not completely solved even in IPS mode. IPS mode has excellent viewing angle characteristics when the screen is viewed from top and bottom or from left and right. FIG. 13 shows those characteristics in polar coordinates. The angles in FIG. 13 are azimuth. FIG. 13 shows characteristics as that the first ellipse whose major axis is in 0-180 degree and the second ellipse whose major axis is in 90-270 degree superpose. In FIG. 13, a distance from the origin indicates a relation between a certain contrast and a tilting angle from the normal axis to the screen. FIG. 13 shows when the screen is viewed with certain tilting angle from normal direction of the screen, the contrast is highest in azimuth of 0-180 degree and 90-270 degree.

Figure 14:
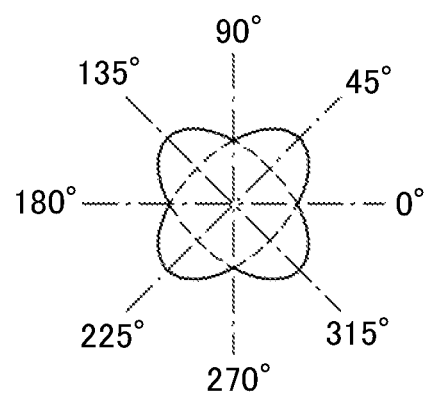
FIG. 14 is an example of viewing angle characteristics of TN (Twisted Nematic) mode liquid crystal display device.

FIG. 14 shows viewing angle characteristics of TN mode liquid crystal display device. How to read FIG. 14 is the same as explained in FIG. 13. Namely, FIG. 14 shows when the screen is viewed with certain tilting angle from normal direction of the screen, the contrast is highest in azimuth of 45-225 degree and 135-315 degree.

When IPS mode and TN mode are combined, inferior one in viewing angle characteristics becomes conspicuous. Therefore, if viewing angle characteristics is emphasized, IPS mode is preferably used in both the liquid crystal display panel and the liquid crystal light valve.

Figure 15:
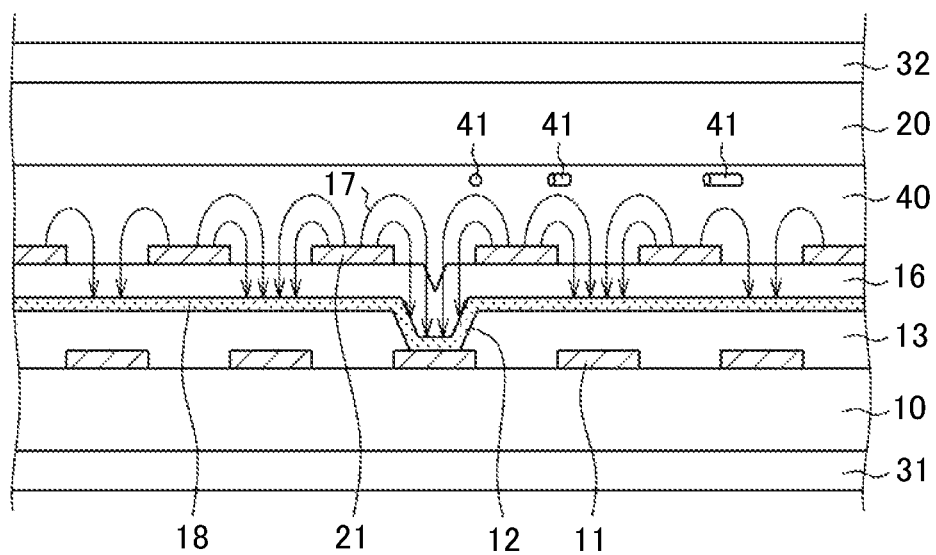
FIG. 15 is a principle diagram of the IPS mode liquid crystal light valve according to the third embodiment.

FIG. 15 is a cross sectional view when IPS mode is used in the liquid crystal light valve. In FIG. 15, the data wirings 11 are arranged in certain pitch above the first substrate 10. The insulating film 13 is formed over the data wirings 11 and the first electrode 18 is formed in a plane shape. The data wring 11 and the first electrode 18 are connected at the wiring connection point 12. Up to this structure, FIG. 15 is the same as FIG. 7. The first electrode can be formed by oxide semiconductor film 15; in this case, however, the insulating film 13 needs to be formed by silicon oxide film.

In FIG. 15, the interlayer insulating film is formed covering the first electrode 18. When the first electrode 18 is formed by the oxide semiconductor film 15, the interlayer insulating film 16 is formed by the silicon oxide film; however, when the first electrode 18 is formed by the transparent conductive film (metal oxide conductive film), the interlayer insulating film 16 can be either silicon nitride or silicon oxide. Since silicon nitride has larger dielectric constant, a silicon nitride film is sometimes advantageous.

The second electrode 21, which works as the common electrode, is formed in comb like shape on the interlayer insulating film 16. The second electrode 21 is formed by ITO, the same as data wiring 11. The second electrodes 21 extend in normal direction to the plane of paper and are arranged in lateral direction; namely formed in comb like shape. An alignment film is formed over the second electrode 21, but the alignment film is neglected in FIG. 15.

The second substrate 20 is set opposing to the first substrate 10 sandwiching the liquid crystal layer 40. Since the second electrode 21 is formed on the first substrate 10 in the IPS mode liquid crystal display device, only the alignment film is formed on the second substrate 20; however, the alignment film is neglected in FIG. 15. The first polarizing plate 31 is set at the lower side of the first substrate 10 and the second polarizing plate 32 is set at the upper side of the second substrate 20 as the same as FIG. 7.

In FIG. 15, when voltage is applied to the first electrode 18 from the data wiring 11 via wiring connection point 12, a voltage gradation appears according to the electrical resistance of the first electrode 18 as explained in the first embodiment. Consequently, line of forces 17 are generated from the second electrodes 21 to the first electrode 18 through the liquid crystal layer 40, and rotate the liquid crystal molecules 41, as shown in FIG. 15. Thus, transmittance of the liquid crystal layer is controlled.

In FIG. 15, since there is a voltage gradation generated in the first electrode 18, the field in the liquid crystal layer 40, namely, a density of the line of forces 17, gradually decreases according to the distance from the wiring connection point 12. According to change of this field strength, rotating angle of the liquid crystal molecules 41 differ. Namely, a gradation in transmittance in the liquid crystal layer 40 can be generated.

In FIG. 15, since the field is strongest at the vicinity of the wring connection point 12, the liquid crystal molecules 41 rotate almost 90 degree to the plane of paper. The rotating angle of the liquid crystal molecules 41 becomes less according to going away from the wring connection point 12. The light transmittance is controlled by rotation of the liquid crystal molecules 41.

In FIG. 15, the data wirings 11 are arranged in the lateral direction with certain interval. FIG. 15 is a cross sectional view corresponding to FIG. 5 along the line A-A. Therefore, there can appear non-uniformity in brightness or moire in brightness due to dense and sparse of data wirings 11, or moire caused by data wirings 11 themselves as explained in the first embodiment.

Therefore, those problems as several moire and non-uniformity in brightness can be suppressed by forming dummy wirings 50 as explained in the first embodiment.

In FIG. 15, stripe shaped data wirings 11 are arranged in lateral direction with a certain pitch on the first substrate 10. Stripe shaped second electrodes 21 are arranged on the interlayer insulating film 16. In FIG. 15, the second electrodes 21 are located to fill a gap between the data wirings 11 in a plan view. Therefore, a combined transmittance of the first wirings 11 and the second electrodes 21 are constant.

Figure 16:
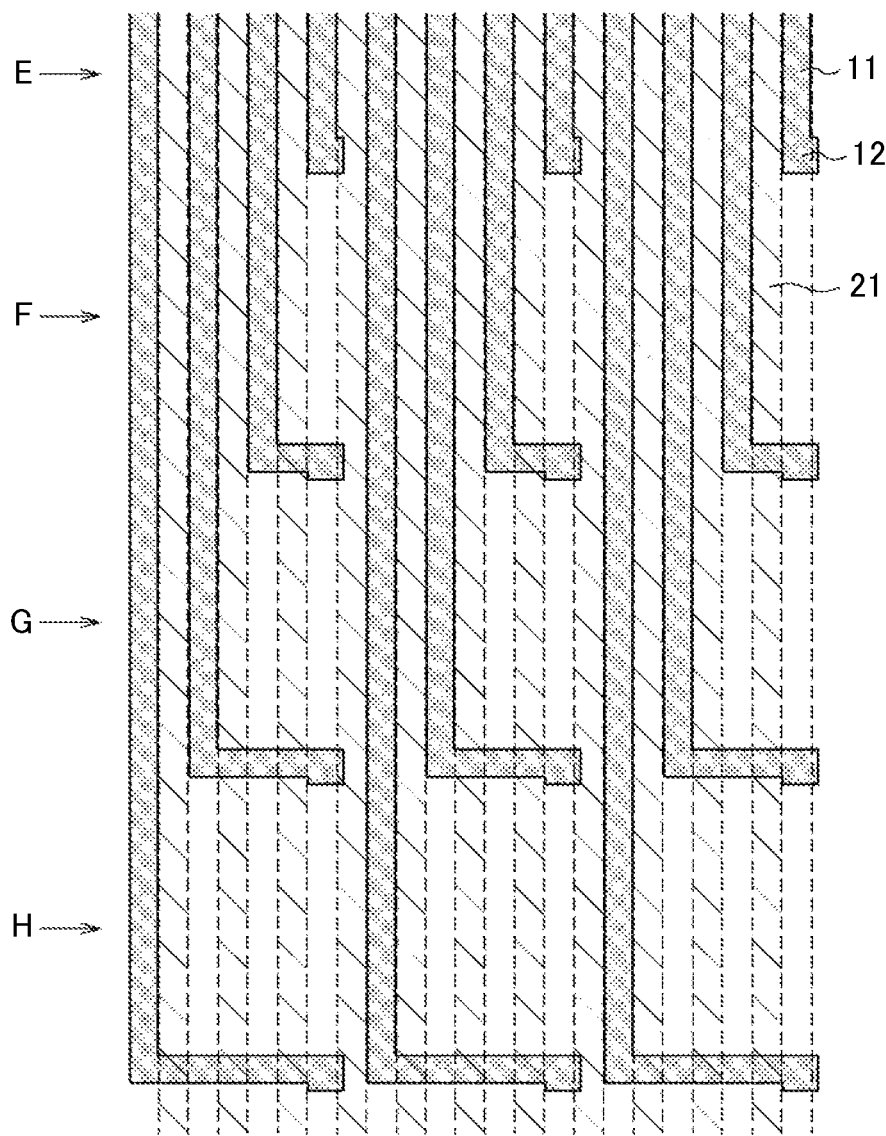
FIG. 16 is a plan view of a first example of the third embodiment.

FIG. 16 is a plan view that the data wirings 11 and the second electrodes 21 overlap. In FIG. 16, the data wirings 11 are shown by gray, and the second electrodes 21 are shown by hatching. As shown in FIG. 16, most area is filled by data wirings 11 and the second electrodes 21, thus, moire or non-uniformity in brightness caused by data wirings 11 themselves or by sparsity and density of data wirings 11 are suppressed.

Figure 17:
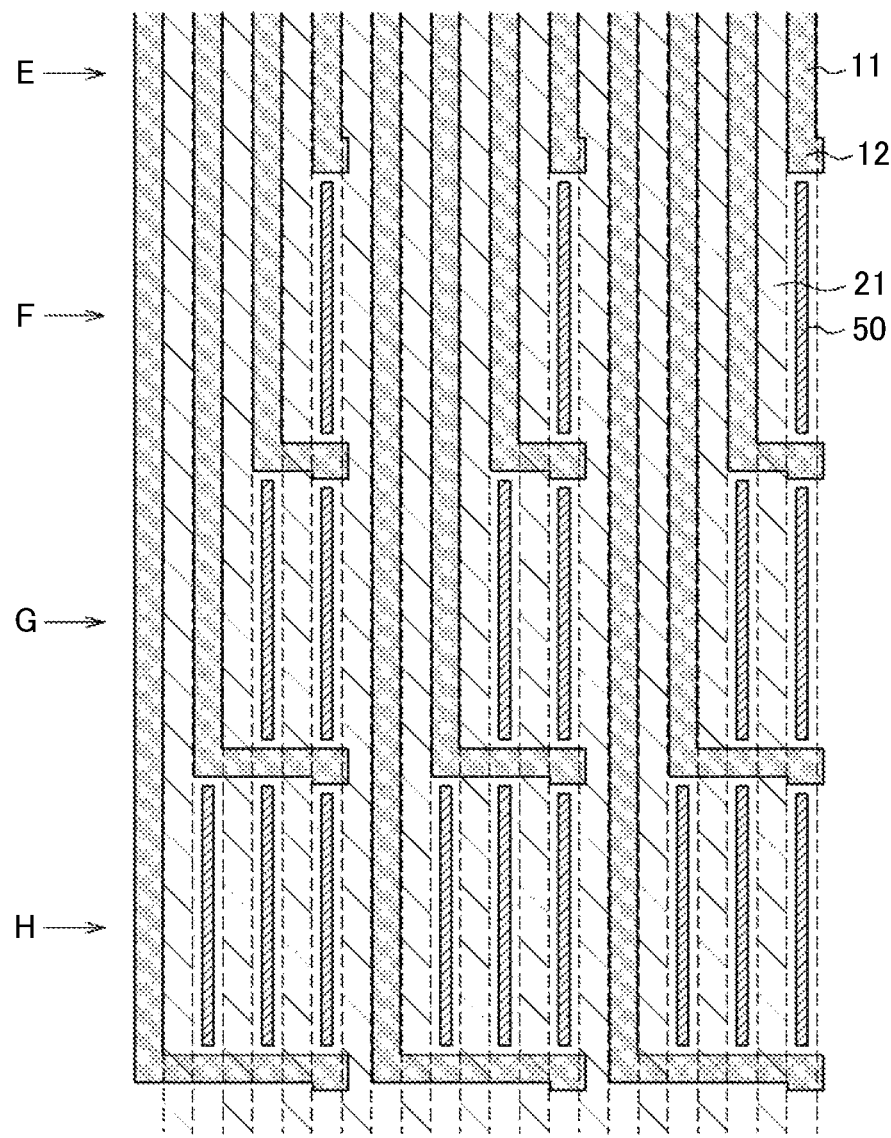
FIG. 17 is a plan view of a second example of the third embodiment.

In FIG. 16, however, there exist areas, which are shown by arrows F, G, and H, not filled by the data wirings 11 and the second electrodes 21, even though the areas are marginal. Therefore, there could be a chance those areas generate moire and non-uniformity in brightness. FIG. 17 is a plan view of the structure that countermeasures this problem.

In FIG. 17, the dummy wirings 50 are set in the areas that are not filled by the data wirings 11 and the second electrodes 21. The dummy wirings 50 are formed in stripe shape. Consequently, almost all the area is completely covered by ITO film. Thus, moire or non-uniformity in brightness caused by data wirings 11 themselves or by sparsity and density of data wirings 11.

In FIG. 17, there exist some gaps between the dummy wirings 50 and the second electrodes 21 in a plan view, however, those gaps can be omitted or the dummy wirings 50 and the second electrodes 21 can overlap in a plan view to avoid those gaps. In this case, the overlap amount is preferably 10 micrometer or less.

In FIGS. 15, 16 and 17, the edges of the data wirings 11 and the second electrodes 21 coincide in a plan view; however, according to necessity in manufacturing process, the edges of the data wirings 11 and the second electrodes 21 can overlap or there can be a gap between the data wirings 11 and the second electrodes 21. The amount of the gap or the overlap is preferably 10 micrometer or less, preferably the less the better according to manufacturing allowance. The amount of the gap or the overlap means at one side of the data wiring 11 or the second electrodes 21.

What is claimed is:

1. A liquid crystal display device including a liquid crystal display panel, a back light and a light control panel set between the liquid crystal panel and the back light comprising:
    the light control panel comprises a first substrate, a second substrate and a liquid crystal layer between the first substrate and the second substrate,
    wherein a plurality of signal wirings, an insulating film covering the signal wirings, a first electrode formed in a planar shape on the insulating film, an interlayer insulating film covering the first electrode, and a second electrode on the interlayer insulating film are formed on a surface facing to the liquid crystal layer of the first substrate,
    the signal wiring and the first electrode are connected via a through hole formed in the insulating film,
    the signal wiring is made of a first transparent conductive film, the first electrode is made of a second transparent conductive film, the second electrode is made of a third transparent conductive film,
    a dummy wiring made of a same material as the first transparent conductive film is formed on a layer that the signal wirings are formed, and
    the second electrode is between the signal wirings in a plan view.

2. The liquid crystal display device according to claim 1, wherein the signal wirings and the second electrode extend in a same direction.

3. The liquid crystal display device according to claim 2, wherein a sheet resistance of the first electrode is in an order of $10^4$ ohm/square.

4. The liquid crystal display device according to claim 1, wherein the signal wiring is made of ITO, the first electrode is made of AZO or IZO or oxide semiconductor, and the second electrode is made of ITO.

5. The liquid crystal display device according to claim 1, wherein the insulating film is made of silicon oxide, and the interlayer insulating film is made of silicon nitride or silicon oxide.

6. The liquid crystal display device according to claim 1, wherein the liquid crystal display device is an IPS mode liquid crystal display device.

* * * * *